(12) United States Patent
Fink et al.

(10) Patent No.: US 7,770,520 B2
(45) Date of Patent: Aug. 10, 2010

(54) INITIATION DEVICE

(75) Inventors: Thomas Fink, Landshut (DE); Thomas Pfeiffer, Kumhausen (DE)

(73) Assignee: Schott AG, Mainz (DE)

( * ) Notice: Subject to any disclaimer, the term of this patent is extended or adjusted under 35 U.S.C. 154(b) by 210 days.

(21) Appl. No.: 11/367,963

(22) Filed: Mar. 3, 2006

(65) Prior Publication Data

US 2006/0207469 A1    Sep. 21, 2006

(30) Foreign Application Priority Data

Mar. 3, 2005    (DE) .................. 10 2005 009 644

(51) Int. Cl.
*F42B 3/10* (2006.01)
*F42B 3/12* (2006.01)

(52) U.S. Cl. ............................... 102/202.12
(58) Field of Classification Search ............ 102/202.5, 102/202.9, 202.12, 202.14
See application file for complete search history.

(56) References Cited

U.S. PATENT DOCUMENTS

| | | | | |
|---|---|---|---|---|
| 3,082,691 A * | 3/1963 | Evans et. al. | ............ | 102/202.14 |
| 3,117,519 A * | 1/1964 | Hamilton et. al. | ........ | 102/202.1 |
| 3,249,047 A * | 5/1966 | Gill et. al. | ............ | 102/202.14 |
| 4,040,356 A * | 8/1977 | Voreck et al. | .......... | 102/202.14 |
| 4,402,269 A * | 9/1983 | Smith | .................... | 102/202.13 |
| 5,035,179 A * | 7/1991 | Bender et al. | ............ | 102/202.5 |
| 5,200,574 A * | 4/1993 | Cunningham et al. | ....... | 102/530 |
| 5,243,492 A * | 9/1993 | Marquit et al. | .............. | 361/247 |
| 5,375,523 A * | 12/1994 | Morris | .................... | 102/202.9 |
| 5,431,101 A * | 7/1995 | Arrell et al. | .............. | 102/202.5 |
| 5,648,634 A * | 7/1997 | Avory et al. | ............. | 102/202.1 |
| 5,686,691 A * | 11/1997 | Hamilton et al. | ......... | 102/202.5 |
| 5,929,367 A * | 7/1999 | Neff et al. | ................. | 102/202.7 |
| 6,343,000 B1 * | 1/2002 | Yokoyama et al. | .......... | 361/247 |
| 6,557,474 B1 | 5/2003 | Morte et al. | ............. | 102/202.1 |
| 6,601,514 B1 * | 8/2003 | Bretfeld et al. | ........ | 102/202.12 |
| 6,615,735 B2 * | 9/2003 | Enzmann et al. | ............ | 102/288 |

FOREIGN PATENT DOCUMENTS

| | | |
|---|---|---|
| DE | 2945803 | 5/1981 |
| DE | 19917236 | 10/1999 |
| DE | 20020102 | 4/2001 |
| DE | 10133223 | 10/2002 |
| DE | 20314580 | 8/2004 |

* cited by examiner

*Primary Examiner*—Bret Hayes
(74) *Attorney, Agent, or Firm*—Ohlandt, Greeley, Ruggiero & Perle, LLP (57) ABSTRACT

An ignition device, which is simple and inexpensive to produce, for a pyrotechnic protection device, in particular an airbag or seatbelt tensioner is provided. The ignition device includes a base with a deformed metal carrier part having a current leadthrough for an electrical ignition and a cap connected to the base, a propellant charge being enclosed between the base and cap, and the metal carrier part of the base having a base body and a welding rim of reduced thickness compared to the base body, the cap being welded to the welding rim by way of an encircling weld seam.

20 Claims, 7 Drawing Sheets

INITIATION DEVICE

CROSS REFERENCE TO RELATED APPLICATIONS

This application claims benefit under 35 U.S.C. §119 of German Patent Application No. 10 2005 009 644.1, filed Mar. 3, 2005, the entire contents of which are incorporated herein by reference.

BACKGROUND OF THE INVENTION

1. Field of the Invention

The invention relates in general terms to ignition devices as are used for the ignition of a pyrotechnic passenger protection device. In particular, the invention relates to the configuration of the housing of an ignition device of this type.

2. Description of Related Art

In particular airbags and seatbelt tensioners are used as pyrotechnic passenger protection devices in motor vehicles. Safety systems of this type can considerably reduce the risk of injury. However, a precondition is that the safety systems must not fail in the event of a collision. In this context, particular attention is also paid in particular to the ignitors of pyrotechnic devices of this type, which are indispensable for a safety device of this type to function.

In particular, the ignitors have to continue to function perfectly even many years after they have been produced. To ensure that they function perfectly, it is necessary to ensure that the propellant charge which is present in the ignitor does not change over the course of time. Changes of this type may be caused, for example, by moisture penetrating into the ignitor. It is therefore important for the propellant charge of the ignitor to be hermetically encapsulated. The ignitor also has to release the gases from the ignited propellant charge in the correct direction in order to ignite the propellant charge of a gas generator of the safety system. To ensure that this occurs, ignitors which are known from the prior art have a cap or a cover and a similar solid base, between which the propellant charge is enclosed in a cavity formed from these parts. This design is intended to ensure that in any event the cap or the cover or part of it tears off.

Ignitors of this type are known for example from DE 203 07 603 01, DE 198 36 278 C2, DE 10 2004 005 085 A1, DE 101 16 785 A1, DE 198 36 278 A1 or DE 100 39 447 A1. Complex turned parts generally have to be used for the solid bases. A further problem with bases of this type is that of producing a hermetic connection to the cap or cover. At least during welding, the component is subject to considerable heating, since the solid base dissipates a large amount of heat from the welding location

BRIEF SUMMARY OF THE INVENTION

Therefore, the invention is based on the object of providing improved airbag ignitors, which are simpler and less expensive to produce. This object is achieved in a very surprisingly simple way by the subject matter of the present disclosure.

Accordingly, the invention provides an ignition device for a pyrotechnic protection device, in particular an airbag or seatbelt tensioner, which comprises a base with a deformed metal carrier part having a current leadthrough for an electrical ignition and a cap connected to the base, a propellant charge being enclosed between the base and cap, and the metal carrier part of the base having a base body or inner part and a welding rim, the thickness of which is less than that of the inner part or portion, the cap being welded to the welding rim by means of an encircling weld seam.

Moreover, to produce a base for an ignition device of this type, the invention provides a process for producing a base, in which a metal carrier part is produced by means of deformation, the metal carrier part being deformed in such a way that it has a base body with an opening and a welding rim of reduced thickness compared to the base body, and a current leadthrough for electrical ignition being secured in the opening. Then, a base of this type is used to produce the ignition device and joined to a cap by welding at the welding rim of the metal carrier part, so as to enclose a propellant charge.

The design of a base with a thin welding rim means that according to the invention the welding energy supplied during the welding operation can be reduced to such an extent that parts produced by deformation, which are generally thinner and can be produced at significantly lower cost than the expensive turned parts which have hitherto been customary, can now be used as the base. The risk of the current leadthrough or the propellant charge being damaged by the action of heat is also reduced or eliminated altogether.

In the context of the present invention, the term deformation is to be understood as meaning a deforming manufacturing process as distinct from a material-removing manufacturing process or a primary-forming manufacturing process.

In material-removing manufacturing processes, the desired body is produced by removal of material from a blank. These processes include, inter alia, filing, chiseling, sawing, thread-cutting, turning, planing, milling, drilling, counterboring, reaming, broaching, grinding, honing, lapping. Primary-forming processes include, for example, shaping by casting, extruding, injection molding, tape casting, transfer molding, sintering.

Deforming manufacturing processes offer the advantages, in particular over material-removing processes, of an uninterrupted fiber profile, an associated higher strength, saving on material and less expensive manufacturing. Of course, however, the possibility is not ruled out of deforming production processes also being combined with other processes, i.e. for example material-removing and primary-forming processes.

It is preferable for the base body of the metal carrier to have a disk-like basic shape. Such simple basic shapes can easily be produced by deforming manufacturing processes. Furthermore, for inexpensive deforming work, it is favorable if the metal carrier part of the base has a maximum thickness in the range from 2 millimeters to 3.5 mm.

To effectively reduce the welding energy and therefore the heating of the component during welding, it is in particular also advantageous if the thickness of the welding rim is similar to the thickness or wall thickness of the cap. It is preferable for the thickness or wall thickness of the welding rim to differ from the thickness or wall thickness of the cap by at most 75%, preferably by at most 35%, particularly preferably by at most 20%. In particular, it is even possible to use identical material thicknesses for the welding rim and cap. The welding rim may have a thickness of from 0.1 mm to 0.7 mm, preferably a thickness in the range from 0.2 to 0.4 mm. With such low material thicknesses, the heating is very effectively reduced. Preferred thicknesses of the cap are in the range from 0.1 to 0.4 mm, and in particular caps with a material thickness of 0.17 and 0.2 mm are provided.

A particularly preferred deforming process is stamping. Therefore, according to a refinement of the invention, it is provided that the metal carrier part is at least partially formed by stamping. In this case, the metal carrier part of the base in particular may also have a stamped opening for the current leadthrough. In this way, the metal carrier parts can be stamped out of a metal sheet, for example, in their basic shape in one working step.

Further deforming processes which can be used for the metal carrier part of the base include cold-forming, deep-drawing, impact-extruding. By way of example, the welding rim can be shaped by cold-forming or impact-extruding after the stamping operation. In addition to being stamped out of metal sheets, the blanks can also be produced by cutting sections off a rod. The cap can advantageously also be formed at low cost by deforming, in particular at least partially by at least one of the steps of stamping, cold-forming, deep-drawing, impact-extruding.

According to a further embodiment of the invention, the welding rim comprises a ring fused onto the base body of the metal carrier part. This ring may, for example, be a high-temperature solder or a glass solder.

Laser welding is particularly preferred for the connection of cap and base, since laser welding can be used to carry out accurate welding of even such small elements as those of an ignitor. In this context, it is provided in particular that the base is joined to the cap at the welding rim by means of an encircling laser weld seam. In addition to a weld seam, it is also possible to provide a positively locking connection. For example, the metal carrier part and/or the cap may be provided with a corresponding connection element to produce a positively locking connection between the two parts. One example of a connecting element of this type is a sharp edge on the welding rim. In addition, the cap may also have a notch in which the sharp edge engages. By using positively locking connecting elements, such as for example a notch and/or a sharp edge on at least one of the parts comprising the cap or metal carrier part, it is possible for the two parts to be securely connected to one another even prior to the welding, so that for example the parts remain directed toward one another during welding. It is also possible for the welding rim and the cap to be pressed together prior to the welding operation in order for them to be fixedly connected to one another even before the welding operation.

In general terms, to achieve a hermetic encapsulation of the propellant charge, it is advantageous if the encircling weld seam, in particular in the form of a laser weld seam, has an overlap of 5°-150°, preferably 10°. The term overlap is to be understood as meaning that the weld seam overlaps itself. For this purpose, during welding the welding location is guided along the circumference of the welding rim over more than 360°, so that double-welding is carried out along a sector covering from 5 to 15°.

The welding rim can be designed in various ways. According to one embodiment of the invention, a welding rim, which extends in the radial direction of the base body and runs around the base body of the metal carrier part in the circumferential direction, is formed on the metal carrier part. In this embodiment of the invention, the welding rim may advantageously also form part of a securing flange for the ignitor.

In another embodiment, the welding rim extends in the axial direction of the base body and likewise runs around the base body of the metal carrier part along its circumferential direction.

According to yet another embodiment of the invention, the welding rim, as seen in cross section, extends obliquely with respect to the axial center axis of the metal carrier part and runs around the base body along its circumferential direction. This embodiment is advantageous, for example, in order to clamp the cap to the welding rim when it is being pushed onto the base.

The housing of the ignitor is intended to enclose the propellant charge as hermetically as possible, in order to protect it from environmental influences in the long term. When connecting base and cap, this is achieved in particular by the weld seam. However, the current leadthrough may also be inadequately sealed and allow water or other harmful substances to penetrate. To avoid this, it is particularly preferable to produce a glass/metal leadthrough. This comprises a metal pin and a glass insulation in the opening of the metal carrier part, by means of which the pin is insulated with respect to the metal carrier part, which, however, gives rise to the problem that this leadthrough must not become too hot during welding. In particular, the inversion temperature should not be exceeded. The inversion temperature is the term used to describe the temperature at which the compressive stress acting on the glass of the current leadthrough as a result of the glass/metal transition changes to a tensile stress. This is particularly critical since the occurrence of tensile stresses can very easily lead to sudden movements in the glass and/or to the glass becoming detached from the metal carrier part of the base.

In particular if the current leadthrough is arranged eccentrically with respect to the axial center axis of the metal part, the latter can become very hot during welding. However, the thin welding rim means that the welding energy can be reduced to such an extent that damage to both the leadthrough and the propellant charge is avoided. To avoid chemical reactions between the propellant charge and the housing material, it is also preferable to use stainless steel as material for the metal carrier part.

In particular in the case of an eccentrically arranged current leadthrough, it has also proven expedient for the welding not to be commenced in the region where the distance between the current leadthrough and the welding rim is shortest, since over the course of the welding operation this leads to higher temperatures at the current leadthrough. In particular, it is advantageous if the welding is commenced at a location along the welding rim which, on the edge, starting from the axial center axis of the metal carrier part, is at an angle of at least 25°, preferably at least 90° to the position at which the welding rim is at its minimum distance from the current leadthrough, and particularly preferably lies opposite this position.

In an advantageous refinement of the invention, furthermore, it is possible to provide an opening, narrowing from the interior to the outer side of the metal carrier part, for the current leadthrough, in order, as the pressure builds up in the interior following ignition, to prevent the current leadthrough from being forced out of the opening.

An ignition bridge is preferably used to ignite the propellant charge by means of a current or voltage pulse. This ignition bridge may, for example, comprise a wire connected to the current leadthrough and the housing. This wire is made to glow by the current or voltage pulse and thereby ignites the propellant charge. According to a further embodiment of the invention, the ignition bridge may also comprise a thick-film conductor connected to the pin of the current leadthrough. This thick-film conductor can then easily be soldered to the pin of the current leadthrough and does not need to be welded to the pin, for example. In particular, it is possible to use an insulating plate to which the thick-film conductor has been applied. This plate is then arranged on the metal carrier part and the conductor is connected to the pin of the current leadthrough. The insulating plate which is in this way, in the finished ignitor, arranged on the inner side of the metal carrier part additionally has the particular advantage that it can also act as a thermal insulation. An arrangement of this type in particular allows the action of heat on the propellant charge during welding to be reduced further, so that, in conjunction with the reduction in the welding energy required brought about by the welding rim, it is even possible to use temperature-sensitive propellant charges.

According to yet another refinement of the invention, as an alternative or in addition to an insulating plate with thick-film conductor, a semiconductor chip which is arranged on the inner side of the metal carrier part and is connected to the current leadthrough is used. This semiconductor chip may, in addition to an ignition device, such as for example a conductor layer, also include electronic circuits in order to make the ignition device more intelligent.

A housing as is provided according to the invention for an ignition device is also suitable for further applications on account of the hermetic encapsulation achieved by the housing. In particular, consideration is also given to hermetically encapsulating electrical or electronic components using a housing according to the invention with base and a cap welded to a welding rim of the base. Accordingly, the invention also provides in general terms a housing, in particular for an ignition device as described above, or also a sensor, comprising a base with a deformed metal carrier part having at least one current leadthrough, and a cap connected to the base, it being possible, by way of example, depending on the intended use, to accommodate a propellant charge or a sensor device between the base and cap, and the metal carrier part of the base having a base body and a welding rim of reduced thickness compared to the base body, the cap being welded to the welding rim by means of an encircling weld seam. The housing including its features and production otherwise corresponds to the description of an ignition device, with the concomitant advantages. Pressure or temperature sensors are particularly suitable as sensors which can be hermetically encapsulated using the housing. Such sensors according to the invention can then be used inter alia even in aggressive media.

In the text which follows, the invention is explained in more detail on the basis of exemplary embodiments and with reference to the drawings, in which identical and similar elements are provided with the same reference designations and the features of various exemplary embodiments can be combined with one another.

Figure 1:
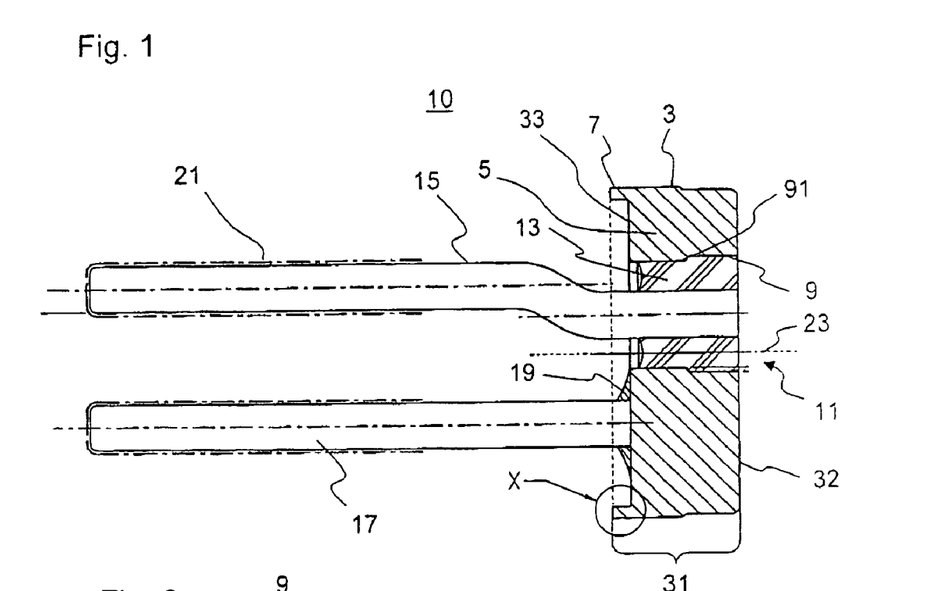
FIG. 1 shows a cross-sectional view of an embodiment of a base according to the invention for an ignitor of a pyrotechnic protection device.
Figures 2, 3:
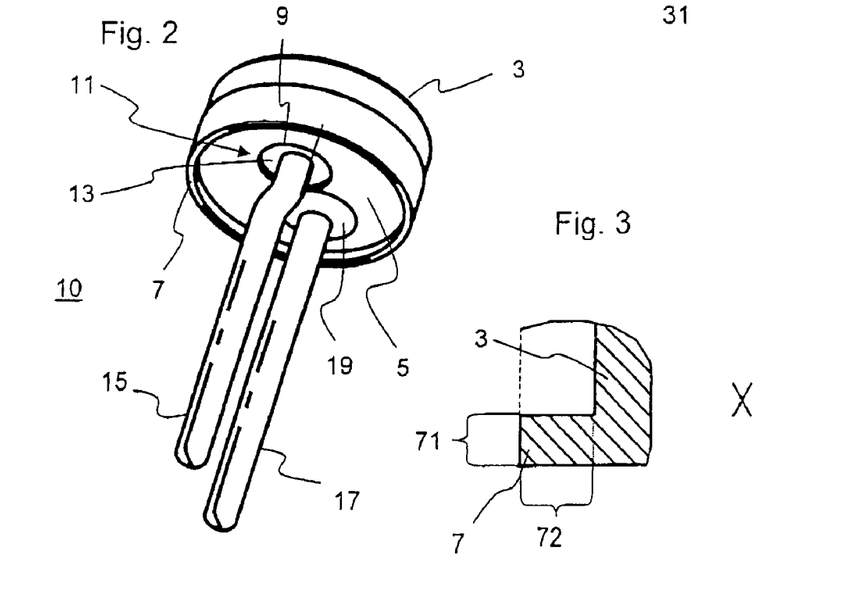
FIG. 2 shows a perspective view of the base illustrated in FIG. 1.
FIG. 3 shows an enlarged excerpt of the welding rim of the base illustrated in FIG. 1.

FIGS. 1 to 3 illustrate a base 10 of an ignition device according to the invention for a pyrotechnic protection device. FIG. 1 shows a sectional view of the base 10 and FIG. 3 shows an enlarged view of the excerpt indicated by "X" in FIG. 1. FIG. 2 shows a perspective illustration of the base 10.

The base 10 comprises a deformed metal carrier part 3 having a base body 5 which has a disk-like basic shape. The metal carrier part 3 also comprises a welding rim 7 which is arranged at the outside edge of the base body 5. This welding rim 7 extends in the axial direction with respect to the axial center axis 23 of the base body 5 and runs around the base body 5 in the circumferential direction of the latter. A rim of this type is formed, for example, by further deformation of a stamped-out, disk-like blank of the metal carrier part. To avoid corrosion or a reaction with the propellant charge, it is preferable for stainless steel to be used as material for the metal carrier part 3, even though this material is more difficult to deform than many other metals.

In particular, the welding rim 7 also has a thickness 71 which is significantly less than the thickness 31 of the disk-like base body 5 of the metal carrier part 3. The result of this is that less thermal energy is required during the subsequent welding of the metal carrier part 3 to a cap. Therefore, it is preferable to use a maximum thickness 31 of the metal carrier part 3 of the base 10 in the range from 1.5 millimeters to 3.5 mm. By contrast, the welding rim has a thickness of only 0.1 mm to 0.7 mm, preferably a thickness in the range from 0.2 to 0.4 mm. The height 72 of the welding rim, moreover, is preferably of the same order of magnitude. A welding rim 7 of this type can be produced, for example, by cold-forming and displacement of material of a blank for the metal carrier part.

Moreover, a current leadthrough 11 with a pin 15 is arranged in an opening 9 in the metal carrier part 3. The opening 9 can be produced, for example, by stamping. Consideration is also given in particular to stamping a blank of the metal carrier part 3 out of a metal sheet, with the opening 9 also being stamped out at the same time by means of a suitable punch. Then, the blank is deformed in a further deformation step so as to form the welding rim 7. This can be done, for example, by cold-forming, deep-drawing or impact-extruding. However, the invention does not rule out the possibility of drilling the opening 9, i.e. producing it by means of a material-removing process.

The pin 15 is used for contact-connection of an electrical ignition, for example in the form of a glow wire as ignition bridge, by means of which the propellant charge enclosed in the finished ignitor is ignited. The current leadthrough 11 is designed in particular as a glass/metal leadthrough, with glass 13 serving as an insulation material between pin 15 and the wall of the opening 9 in the metal carrier part. A current leadthrough of this type offers the particular advantage of not only providing very good electrical insulation but also being hermetically sealed with respect to constituents of the atmosphere which over the course of time can react or mix with the propellant charge, thereby adversely affecting its properties. Accordingly, the use of a current leadthrough of this type allows the ignitor to be triggered reliably even after a long time. To prevent the current leadthrough from being pressed out of the metal carrier part by the pressure which builds up as a result of the propellant charge following the ignition, a shoulder 91 is additionally provided in the opening 9, so that the opening, as seen from the side 32 which following assembly is arranged on the inside in the housing formed with the cap, narrows toward the outer side 33. It is in this way possible to achieve a secure glass/metal join with the relatively thin metal carrier part 3 of the base 10.

In the example shown in FIG. 1 to FIG. 3, furthermore, the current leadthrough 11 is arranged eccentrically with respect to the axial center axis 23 of the metal carrier part. The result of this is that even with a small radius of the metal carrier part sufficient space is available for securing a further pin 17. The further pin 17 is soldered to the metal carrier part 3 using brazing solder 19. To make the ignition bridge glow by means of a voltage pulse supplied to both pins 15, 17, in the present embodiment said ignition bridge is accordingly connected not only to the pin 15 but also to the metal carrier part or the cap. Pins 15, 17 which, at least in the connection region for a plug connector have a gold plating 21, are used to improve the electrical contact-connection.

Figures 4, 7:
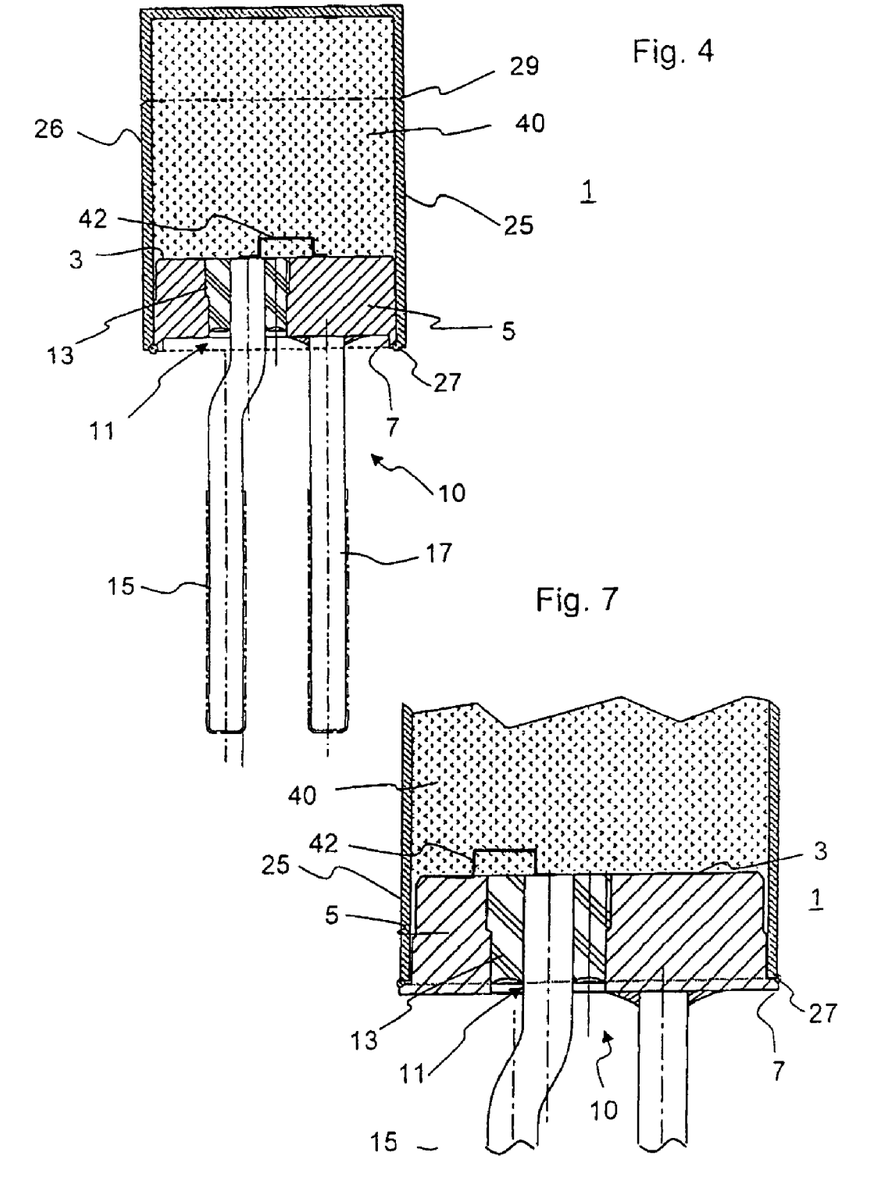
FIG. 4 shows a cross section through an ignitor according to the invention having a base as illustrated in FIGS. 1 to 3, FIGS. 5A, 5B show temperature ranges on a metal carrier part (FIG. 5A) without welding rim and the glass (FIG. 5B) of an eccentrically arranged glass/metal leadthrough while the cap is being welded to the base.
FIG. 7 shows an excerpt of a cross section through a further embodiment of the invention.

FIG. 4 shows a cross section through an ignitor 1 according to the invention with a base 10, as has been described with reference to FIG. 1 to 3. The ignitor 1 is produced using a base 10 of this type, by connecting a cap 25 to the metal carrier part 3 in such a way as to enclose a propellant charge 40, the connection being made by means of an encircling laser weld seam 27 at the welding rim 7. The base 10 or its metal carrier part 3 and the cap 25 together, as a result of the welding by means of an encircling weld seam, produce a hermetically sealed housing 26 for the propellant charge.

A distinction is drawn in particular between two processes for laser welding: heat-conducting welding and penetration welding. A characteristic feature of the heat-conducting welding which is particularly preferred for the present invention is that the material is melted only at the surface. Given a sufficient intensity, the materials melt, flow into one another and after cooling solidify to form a common weld seam. The weld seams have a depth of typically a few tenths of a millimeter. Inter alia pulsed YAG lasers are suitable for this process which is used in particular for the processing of thin-walled components. In particular when welding profiled sections and thick-walled tubes, penetration welding with a $CO_2$ laser in cw mode ("cw"=continuous wave) is used. In this case, the material at the surface is heated to such an extent that it evaporates and forms an opening known as a keyhole. However, the invention does not rule out the possibility of also using a penetration welding process to join base 10 and cap 25. The cap 25 can also advantageously be produced at low cost using deforming manufacturing steps.

In addition, before or during the joining of base 10 and cap 25, an ignition bridge 42 is also connected to the pin 15 of the current leadthrough and the cap or, as shown in FIG. 4, the metal carrier part 3. By way of example, the ignition bridge 42 may be a glow wire which is attached to pin 15 and metal carrier part 3 in each case by means of a spot weld. In many cases, unlike in the simplified form of illustration presented in FIG. 4, an early-ignition substance which surrounds the ignition bridge is used in addition to the propellant charge 40.

The cap 25, which is connected to the base 10 at the welding rim 7 by means of the encircling laser weld seam 27 in particular has a wall thickness that is comparable to the thickness or wall thickness of the welding rim 7. This applies in particular at the welding location. The wall thickness may also differ in other regions of the cap. For example, the cap 25 of the example illustrated in FIG. 4 has a desired breaking location 29, at which the cap 25 tears open as a result of the pressure which is evolved as the propellant charge 40 ignites. Contrary to what is shown in FIG. 4, it is also possible, by way of example, to use a star-shaped desired breaking location in the cover of the cap, since a desired breaking location of this type tears open particularly easily and does not involve a cap part tearing off.

The welding energy required is considerably reduced by selecting comparable wall thicknesses for cap 25 and welding rim 7. As a result, the extent to which the glass/metal leadthrough 11 and the enclosed propellant charge 40 are heated is considerably reduced. It is preferable for the welding rim 7 to be formed in such a way that the thickness or wall thickness of the welding rim 7 differs from the thickness or wall thickness of the cap 25 by at most 75%, in particular by at most 35%, particularly preferably by at most 20%. Within the scope of manufacturing tolerances, it is advantageous in particular to use the same wall thicknesses for cap 25 and welding rim 7.

FIGS. 5A-5C, 6A to 6C show simulations of the temperature profile on metal carrier parts and the glass 13 of a glass/metal leadthrough in the metal carrier parts.

Figure 5A:
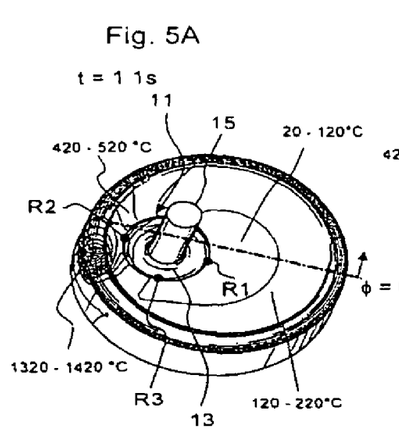
Figure 5B:
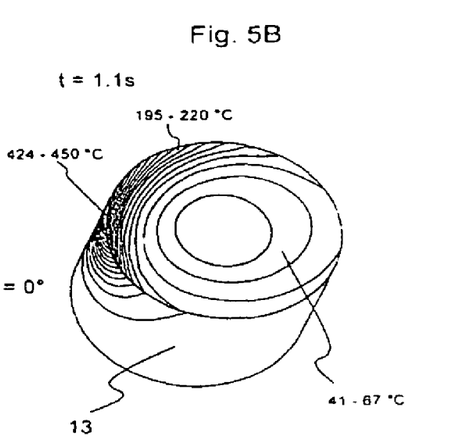
Figure 5C:
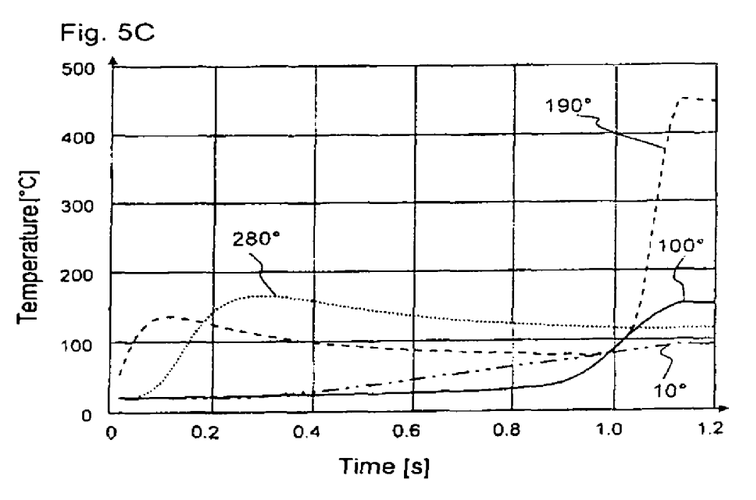
FIG. 5C shows the temperature profile at a plurality of measurement points on the inner surface of the opening of the metal carrier part shown in FIG. 5A during the welding operation.
Figure 6A:
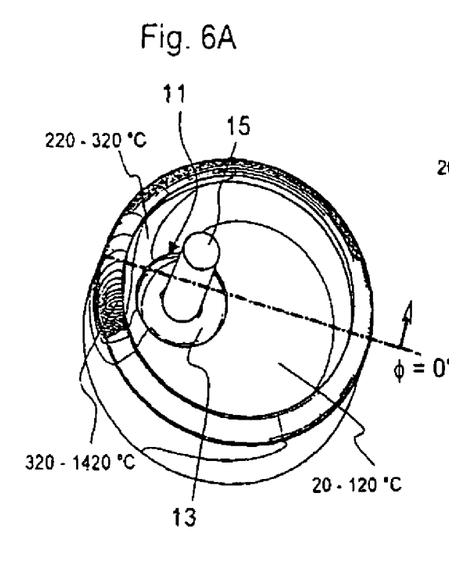
FIGS. 6A, 6B show temperature ranges on a metal carrier part (FIG. 5A) with welding rim and the glass (FIG. 5B) of an eccentrically arranged glass/metal leadthrough while the cap is being welded to the base.
Figure 6B:
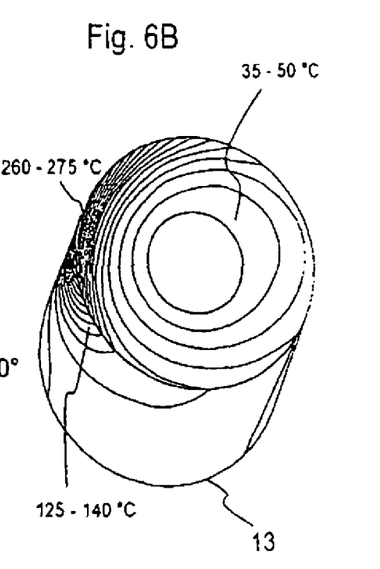
Figure 6C:
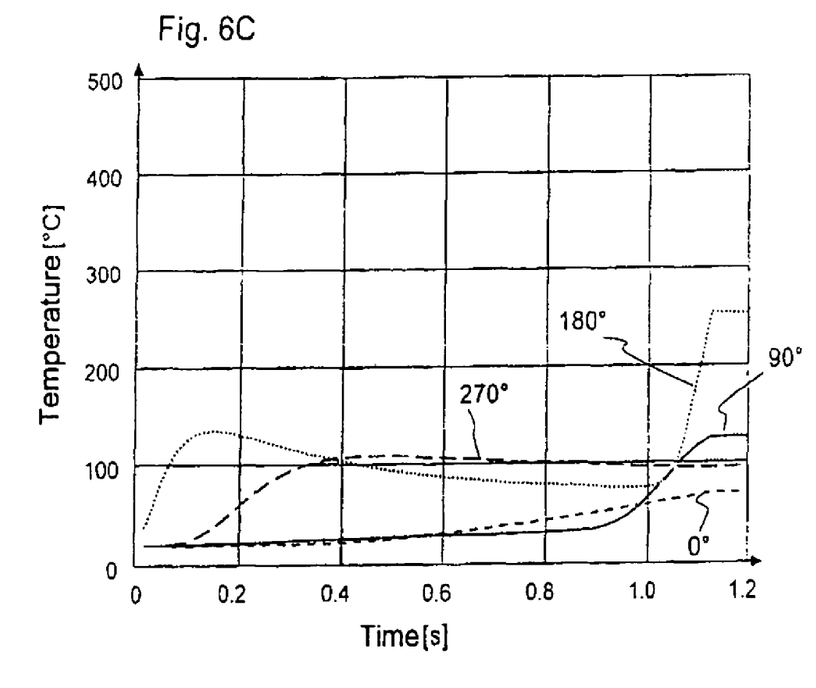
FIG. 6C shows the temperature profile at a plurality of measurement points on the inner surface of the opening of the metal carrier part shown in FIG. 6A during the welding operation.

FIGS. 5A to 5C show simulation results for a metal carrier part without welding rim, and FIGS. 6A to 6C show the results for a metal carrier part of a base according to the invention with welding rim.

The assumption for the results shown in these figures was in each case that the weld seam was commenced at a position $\phi=180°$ on the circumference of the metal carrier part. The position $\phi=0°$ is marked in FIGS. 5A and 6A and lies on a radial axis passing through the center point of the eccentrically arranged center axis of the current leadthrough and the axial center axis of the metal carrier part. Accordingly, the weld seam is in each case commenced at the location where the weld seam is at the shortest distance from the current leadthrough. The following parameters were employed for the simulations: 2.6 Joules per pulse, 100 pulses per second, total heating energy transmitted 291.5 Joules, welding time of 1.12 seconds at 0.7878 Joule per angle degree $\phi$, with the weld seam covering a total angle of 370° (corresponding to an overlap of 10°). The heat is dissipated at the outer skin of the ignitor by convection. A heat transfer coefficient of 10 $W/m^2 K$ at an ambient temperature of 20° C. is assumed in this context.

FIGS. 5A, 5B, 6A, 6B each indicate isotherms, and some of the temperature ranges between the isotherms after 1.1 seconds, i.e. just before the welding operation is terminated, are indicated. The maximum temperature is in each case 1420° C. at the welding location. The diagrams plotted in FIGS. 5C and 6C each show the temperature profile at a number of measurement points which are located on the inner surface of the opening of the current leadthrough in the metal carrier part or on the metal/glass interface in the opening. The measurement points are in each case indicated in degrees. For clarity, FIG. 5A shows three measurement points R1, R2, R3, R1 lying at 0°, R2 at 180° and R3 at 270°. The measurement position 180° is therefore, similarly to the angle $\phi=180°$, at the location where the distance between weld seam and current leadthrough 11 is shortest.

As can be seen from a comparison of FIGS. 5A-5C with FIGS. 6A-6C, the heating is considerably less in the case of a base according to the invention with a welding rim even when the current leadthrough is arranged eccentrically with respect to the axial center axis. In particular, the temperatures of 450° which are reached at the glass/metal leadthrough in the case of a metal carrier part without a welding rim can lead to the inversion temperature of the glass/metal transition being exceeded. This can cause the current leadthrough to lose its sealing properties or even to become detached from the opening. Furthermore, temperatures of greater than 380° C. are also critical for the propellant charge. By contrast, with a welding rim according to the invention, the peak temperatures reached at the glass/metal leadthrough are much lower, at most 275° C.

The thermal stresses can be reduced still further if welding is not commenced in the region where the distance between weld seam and current leadthrough is shortest. For example, it is advantageous if the welding is commenced at a location which on the edge, starting from the axial center axis of the metal carrier part, lies at an angle of at least 25° (corresponding to an angle $\phi=155°$ or $\phi=205°$), preferably at least 90° (corresponding to an angle $\phi=90°$ or $\phi=270°$) with respect to the position where the distance between the welding rim and the current leadthrough is shortest, and it is particularly preferable for the welding to be commenced at a location which lies opposite this position (corresponding to an angle $\phi=0°$). Even with this type of starting position when welding, however, temperatures of over 400° C. will still be reached at the glass/metal leadthrough in a comparable housing without a welding rim, whereas the peak temperatures at the glass/metal leadthrough with a housing according to the invention with a welding rim are then well below 300° C.

FIG. 7 shows an excerpt from a cross section through a further embodiment of the invention. In this embodiment of the invention, the welding rim 7 of the metal carrier part does not extend in the axial direction, as in the example shown in FIG. 1, but rather in the radial direction of the base body and runs around the base body of the metal carrier part 3 in the circumferential direction. In this way, the welding rim forms a stop when the cap 25 is being fitted, so that it is very easy to accurately position the cap 25. The welding rim 7 of the example illustrated in FIG. 7 can advantageously be obtained by deep-drawing or impact-extruding of, for example, a stamped blank.

Figure 8:
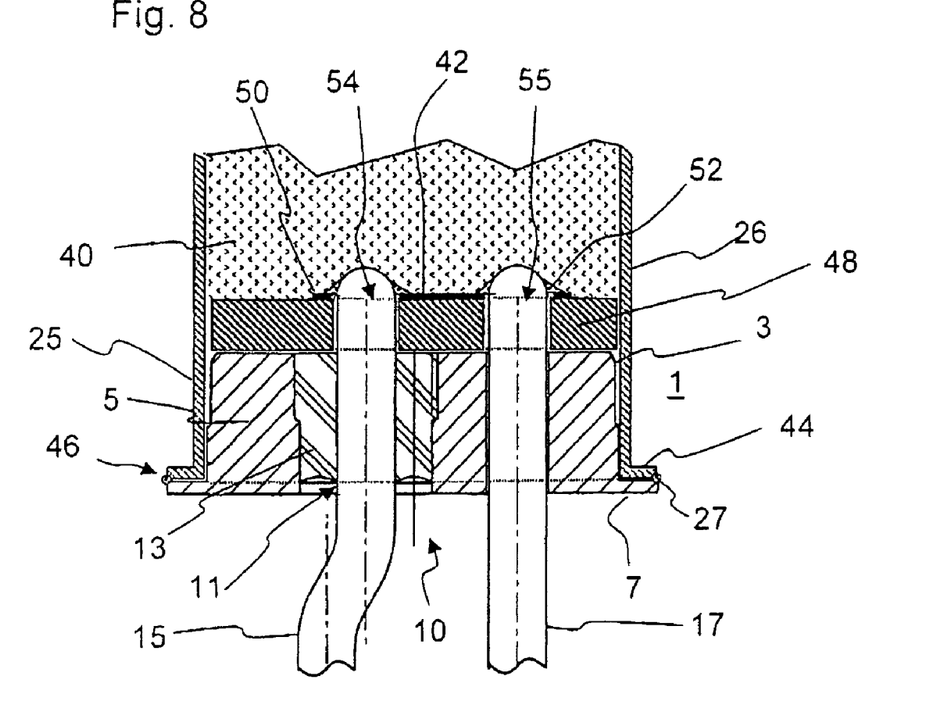
FIG. 8 shows a variant of the exemplary embodiment illustrated in FIG. 7.

FIG. 8 shows a refinement of the example illustrated in FIG. 7. In the embodiment illustrated in FIG. 8, the welding rim 7, starting from the base body 5, likewise extends in the radial direction, but has a greater height. The cap 25 also has a similar rim extending in the radial direction, or a flanged edge 44, at which the cap 25 is joined to the welding rim 7 of the metal carrier part 7 by means of an encircling weld seam, which is preferably also designed with overlapping ends, i.e. with the overlap referred to above. The flanged edge 44 and the welding rim 7 then form a flange 46 of the ignition device 1. This flange 46 can in particular also be used as a securing flange for fixing the ignition device.

Figure 9:
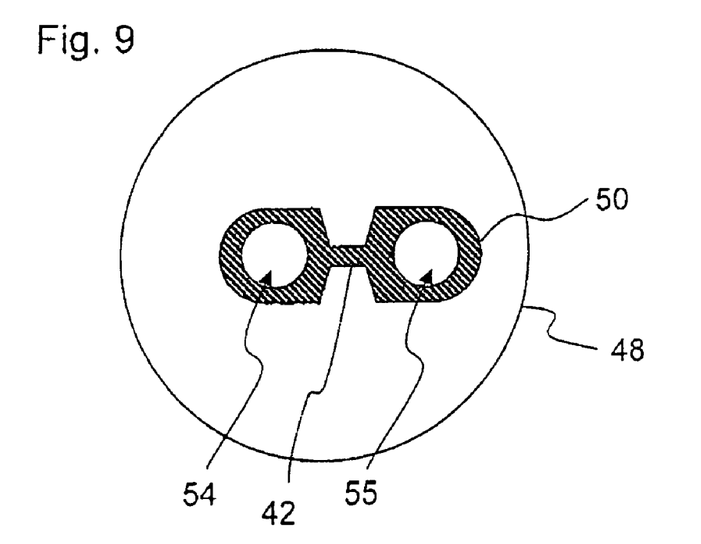
FIG. 9 shows a plan view onto an insulating plate with thick-film conductor.

The ignition device shown in FIG. 8 also differs from the embodiments of the invention illustrated in FIGS. 1 and 7 by virtue of the form of ignition bridge 42. In the example illustrated in FIG. 8, this ignition bridge 42 comprises a thick-film conductor 50. The latter is arranged on an electrically insulating plate 48 with openings 54, 55 for the pins 15, 17. It is preferable to use ceramic for the insulating plate 48. FIG. 9 shows a plan view of the insulating plate 48 with the thick-film conductor 50. The thick-film conductor 50 is formed in the manner of an interconnect which surrounds the openings 54, 55 for receiving the pins 15, 17. A portion of the thick-film conductor 50 on the plate 48 is narrowed and thereby forms the ignition bridge 42. The plate 48 with the thick-film conductor is placed onto the pins 15, 17, which in this embodiment project on the inner side of the base. In this case, the securing and contact-connection can be effected in a particularly simple way by soldering the thick-film conductor 50 to the pins 15, 17. In this case, conventional soft solder as used in the electronics industry can also be used as solder 52. In addition to the ease of mounting the ignition bridge, this embodiment of the invention also offers the particular advantage that the electrically insulating plate 48 additionally provides thermal insulation. In combination with the reduction in the welding energy achieved by means of the welding rim according to the invention, it is therefore possible to reduce the heating of the propellant charge 40 still further.

Contrary to what is shown in FIGS. 8 and 9, it is also possible to use a ceramic plate which does not cover the entire bottom of the metal carrier part in order to reduce production costs.

According to yet another refinement of the invention, a semiconductor chip is used instead of or in addition to the electrically insulating plate 48. In addition to the ignition bridge, this chip can also include electronic components, for example in order to equip the ignition device with intelligent electronics and/or its own sensors.

Figure 10:
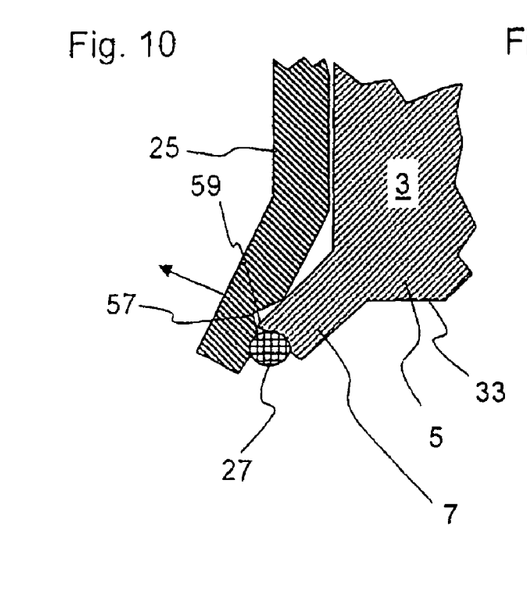
FIGS. 10-12 show excerpts in the region of the welding rim of further exemplary embodiments of ignition devices according to the invention.

FIG. 10 shows, in cross section, an excerpt, in the region of the welding rim 7, of yet another embodiment of the invention. In this embodiment, the welding rim 7 extends obliquely with respect to the axial center axis of the metal carrier part 3, so that it protrudes obliquely outward. As a result, the rim of the cap 25 is stretched apart slightly by the welding rim 7 as it is pushed onto the base, as indicated in simplified form in FIG. 10 by the kink in the cross section of the cap and the arrow. As a result, the two parts are pressed firmly together and can thereby even produce a hermetically sealed arrangement. Moreover, the outer edge of the welding rim 7 forms a sharp edge 59 which engages in a notch 57 which runs around the inner side of the cap in the circumferential direction parallel to the rim of the cap. In this way, the metal carrier part 3 and the cap 25 latch together when the two parts are fitted together, resulting in a positively locking connection. The sharp edge can even cut the notch into the cap itself when the two parts are being fitted together. In addition, the parts are then permanently and fixedly connected to one another by means of an encircling laser weld seam.

Figure 11:
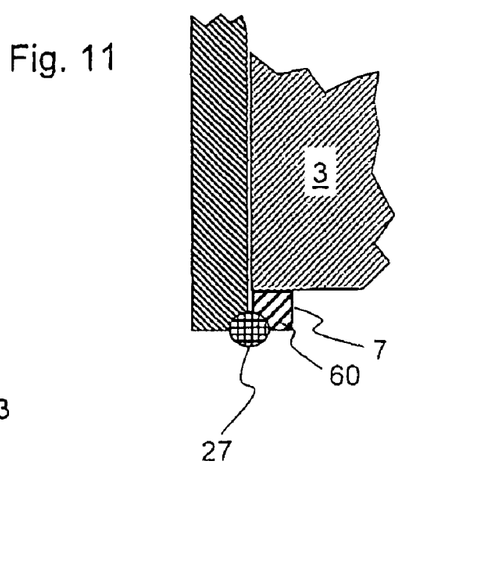

FIG. 11 shows an excerpt from a further embodiment. In this embodiment of the invention, the welding rim 3 is produced by fusing a ring 60 onto the base body 5 of the metal carrier part 3. In this case, by way of example, a ring of brazing solder or a ring of glass solder can be fused on. This ring 60 is then welded again, by laser welding, this time to the cap 25, as in the examples explained above.

Figure 12:
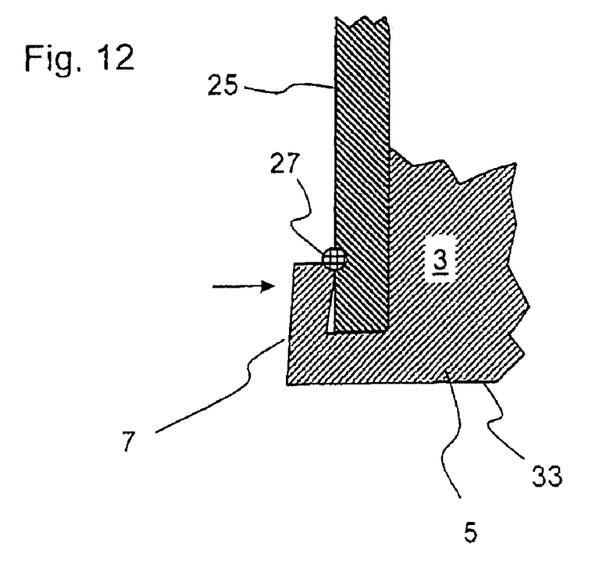

In the embodiment illustrated in FIG. 12, the welding rim 7 is flanged over prior to the welding, as indicated by the arrow, and is thereby pressed firmly to the cap 25. It is also possible in this way to produce a fixed connection between cap 25 and base, which may even already be hermetically sealed.

Figure 13:
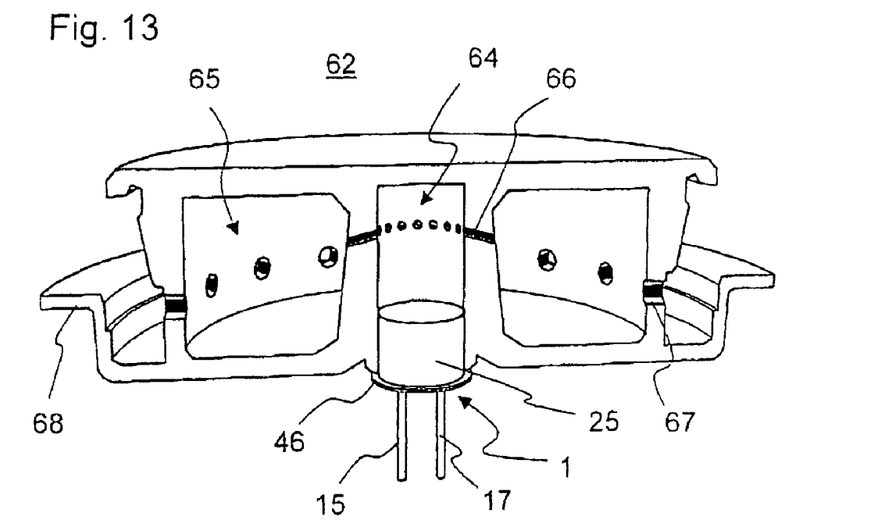
FIG. 13 shows a gas generator with an ignition device according to the invention.

FIG. 13 shows a sectional view of a gas generator, denoted overall by reference 62, of a pyrotechnic protection device with an ignition device 1 according to the invention. The ignition device is not illustrated in section in FIG. 13. The gas generator 62 as shown in FIG. 13 can be used in particular for a steering wheel airbag and is for this purpose installed in the impact absorber of the steering wheel. The gas generator 62 has a central cavity 64, into which the ignition device 1 according to the invention is fitted. The ignition device has, for example, a flange 46 for mounting the device 1 at the outlet of the central cavity 64. However, it is of course also possible to use an ignition device 1 as shown for example in FIG. 1 within a suitably shaped cavity 64. The central cavity 64 is connected by passages 66 to the annular propellant container 65 which contains the propellant, for example propellant pressed into tablet form and comprising sodium azide, potassium nitrate and sand. On ignition, this is ignited by the gas which escapes explosively from the ignition device 1 and for its part releases propellant gases which flow out through the passages 67 and inflate an airbag which is secured, for example, to the securing ring 68.

Figure 14:
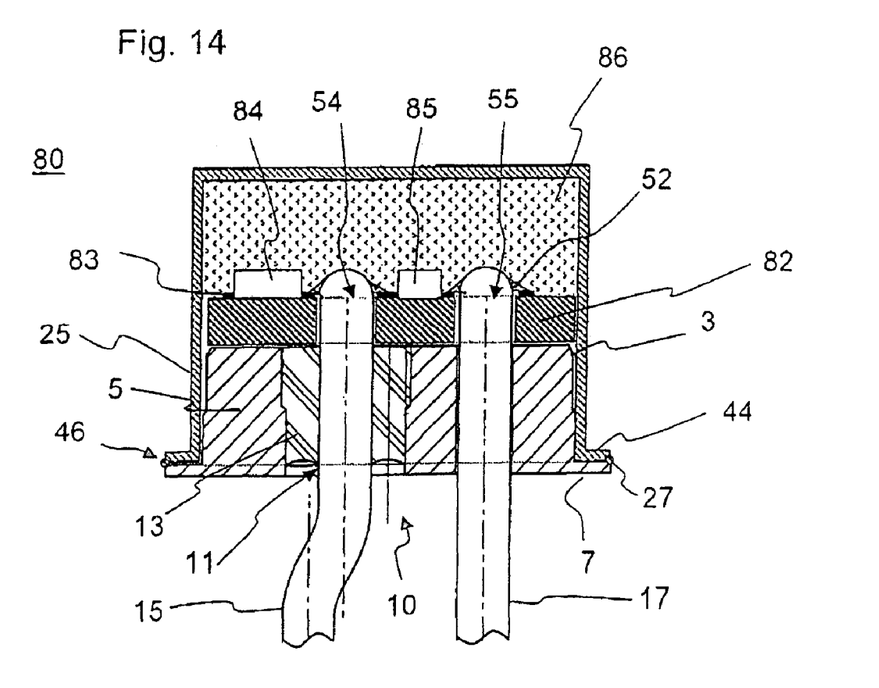
FIG. 14 shows a section through a pressure sensor which is housed in accordance with the invention.

FIG. 14 shows a section through a pressure sensor 1 which has been housed in accordance with the invention. The housing 26 with base 10 and cap 25 of this embodiment of the invention is of similar structure to the housing illustrated in FIG. 8 for the ignition device 1 shown in that figure. The welding rim 7 of the metal carrier part 3 and the flanged edge 44, which has been welded to it, of the cap 25 form a flange 46. The latter can be used for securing in a receiving opening and—together with a sealing ring—for sealing the receiving opening for the sensor 80. A printed circuit board 82 with openings 54, 55 and interconnects 83 has been placed onto the pins 15, 17 and soldered to the pins 15, 17. A sensor device 84 connected to the interconnects and optionally further components 85 are arranged on the printed circuit board 82. The sensor device 84 and components 85 may, for example, be SMT components. A fluid which is additionally enclosed in the housing 26 is responsible for transmitting the pressure that acts on the housing 26 and is to be measured to the sensor device. By way of example, the pressure sensor can be used in a brake system of a motor vehicle for measuring the braking pressure. The hermetic encapsulation enhances the long-term stability of the component, and direct contact with the brake fluid or another fluid—depending on the intended use—is avoided. Other sensors, such as temperature sensors, can also be provided with a housing according to the invention.

It will be clear to the person skilled in the art that the invention is not restricted to the exemplary embodiments described above, but rather can be varied in numerous ways. In particular, the features of the individual exemplary embodiments can also be combined with one another.

LIST OF DESIGNATIONS

1 Ignition device
3 Metal carrier part
5 Base body of 3
7 Welding rim of 3
9 Opening in 3
10 Base
11 Glass/metal leadthrough
13 Glass
15, 17 Pin
19 Brazing solder
21 Gold plating
23 Axial center axis of 3
25 Cap
26 Housing
27 Laser weld seam
29 Desired breaking location in 25
40 Propellant charge
42 Ignition bridge
44 Flanged edge of 25
46 Flange
48 Insulating plate
50 Thick-film conductor
52 Solder
54, 55 Openings for 15, 17 in 48
57 Notch
59 Sharp edge
60 Ring fused onto 5
62 Gas generator
64 Center cavity of 62
65 Propellant container of 62
66, 67 Passages
68 Securing Ring
71 Thickness of 7
72 Height of 7
80 Pressure sensor
82 Printed circuit board
83 Interconnect
84 Sensor device
85 Component
86 Fluid
91 Shoulder in 9

The invention claimed is:

1. An ignition device for a pyrotechnic protection device, comprising:
   a metal carrier part having a disk-like base body with a top surface, a bottom surface, and an outside edge;
   a welding rim arranged at the outside edge of the disk-like base body and extending in a first axial direction away from the bottom surface;
   a first metal pin in an opening in the disk-like base body and extending in the first axial direction;
   a glass insulation material between the first metal pin and the opening of the disk-like base body;
   a second metal pin in electrical communication with the bottom surface of the metal carrier part and extending in the first axial direction;
   a propellant charge on the top surface disk-like base body and extending in a second axial direction away from the top surface;
   a cap enclosing the propellant charge between the disk-like base body and the cap; and
   an encircling weld seam securing a bottom periphery of the cap to the welding rim, wherein the welding rim is sufficient to maintain a peak temperature of the glass insulation material, during formation of the encircling weld seam, to at most 275° C.

2. The ignition device as claimed in claim 1, wherein the welding rim has a thickness that is similar to a cap thickness of the cap.

3. The ignition device as claimed in claim 2, wherein the rim thickness differs from the cap thickness by at most 75%.

4. The ignition device as claimed in claim 1, wherein the metal carrier part is at least partially formed by stamping.

5. The ignition device as claimed in claim 4, wherein the opening comprises a stamped opening.

6. The ignition device as claimed in claim 1, wherein the opening narrows from an interior of the metal carrier part to the outside edge of the metal carrier part.

7. The ignition device as claimed in claim 1, wherein the metal carrier part is at least partially formed by a process selected from the group consisting of cold-forming, deep-drawing, impact-extruding, and any combinations thereof.

8. The ignition device as claimed in claim 1, wherein the cap is formed by a process selected from the group consisting of cold-forming, deep-drawing, impact-extruding, and any combinations thereof.

9. The ignition device as claimed in claim 1, wherein the encircling weld seam comprises an encircling laser weld seam.

10. The ignition device as claimed in claim 9, wherein the encircling weld seam has an overlap of between 5° to 15°.

11. The ignition device as claimed in claim 1, wherein the metal carrier part comprises stainless steel.

12. The ignition device as claimed in claim 1, wherein the welding rim extends in an radial direction of the disk-like base body and runs around the disk-like base body of the metal carrier part in a circumferential direction.

13. The ignition device as claimed in claim 1, wherein the welding rim extends in an axial direction of the disk-like base body and runs around the disk-like base body of the metal carrier part in a circumferential direction.

14. The ignition device as claimed in claim 1, wherein the welding rim extends obliquely with respect to a center axis of the metal carrier part and runs all the way around in a circumferential direction of the disk-like base body.

15. The ignition device as claimed in claim 1, wherein the welding rim forms part of a securing flange for the ignition device.

16. The ignition device as claimed in claim 1, further comprising an ignition bridge connected to the first metal pin, the ignition bridge comprising a thick-film conductor.

17. The ignition device as claimed in claim 16, wherein the thick-film conductor is applied to an insulating plate arranged on the top surface of the metal carrier part.

18. The ignition device as claimed in claim 1, further comprising a semiconductor chip arranged on the top surface of the metal carrier part and connected to the first metal pin.

19. The ignition device as claimed in claim 1, wherein the disk-like base body and the cap are connected by a positively locking connection.

20. The ignition device as claimed in claim 19, wherein the positively locking connection comprises a notch and/or a sharp edge on at least one of the cap and the metal carrier part.

* * * * *